March 24, 1953
D. A. BATTISTE
2,632,707
BREAD SPONGE PRODUCTS AND PROCESS
FOR THE PRODUCTION THEREOF
Filed Aug. 30, 1949
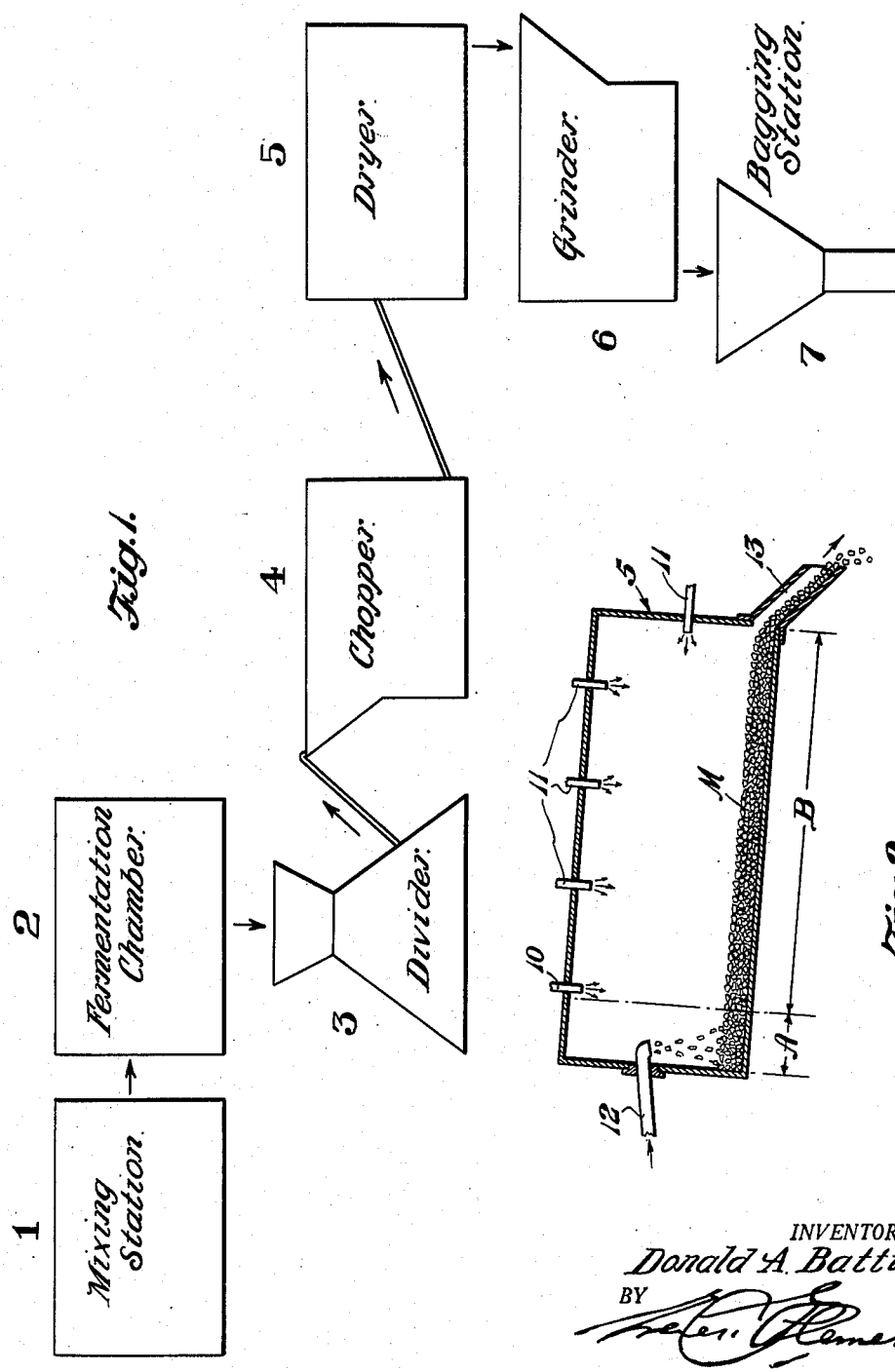
INVENTOR.
Donald A. Battiste
BY
ATTORNEY Patented Mar. 24, 1953

2,632,707

UNITED STATES PATENT OFFICE 2,632,707

BREAD SPONGE PRODUCTS AND PROCESS FOR THE PRODUCTION THEREOF

Donald A. Battiste, Philadelphia, Pa.

Application August 30, 1949, Serial No. 113,227

3 Claims. (Cl. 99—90)

The present invention relates to a bread sponge product and process for the production thereof. More particularly the present invention relates to the preparation of a novel dehydrated dough sponge and to a process for producing the aforesaid sponge, as well as to novel baked products incorporating as a portion thereof the aforesaid sponge.

It has been previously proposed to prepare a material, known as rye sour flour, for baking purposes according to a method which includes the dehydration and subsequent grinding of the sour material by a treatment requiring a relatively long period of time and at a low temperature, i. e. 50° F. Although a process of this kind may be suitable for production of what amounts to a flavoring material for certain types of rye bread, it is not believed to retain any appreciable part of the yeast, forming a part of the sour, in active condition. Hence, when such a product is used in rye bread making it is necessary to also use a relatively large quantity of additional yeast even for the production of a relatively heavy bread.

The present invention is directed primarily to the production of a sponge in dehydrated form wherein the yeast cells are maintained in active or potentially active condition so that when the sponge of the present invention is added to additional flour, yeast and water, together with the usual leavening and flavoring material, a bread is produced of superior quality and of a uniform light texture. In other words, the sponge of the present invention, when reconstituted with water, for example, exhibit all of the desirable qualities of fresh sponge.

It is within the general scope of the present invention therefore to apply the process to be hereinafter described to the production of rye bread as well as white bread and also to the production of doughnut mixes and/or cakes.

In the accompanying drawing:

Fig. 1 is a diagrammatic illustration of the several general steps of the present process; and Fig. 2 is a diagrammatic illustration of the drying process step forming a part of Fig. 1.

Referring to Fig. 1 of the drawing, at the mixing station indicated at 1, a suitable mixture of flour, water, yeast and yeast food is prepared and thoroughly mixed at approximately 72° F. or another suitable temperature. The mix is then removed to a fermentation chamber or proofing room which is maintained at a uniform temperature of approximately 85° F. and indicated in the drawing at 2. The dough mix is allowed to mature in the fermentation chamber for a period of time from one hour up to approximately five hours. From time to time the temperature of the dough is taken and in general a temperature rise of slightly over 1° per hour indicates a proper fermentation so that a total temperature rise of from 3 to 6° F. takes place in the five-hour period.

From the fermentation chamber 2 the matured dough or sponge, which would ordinarily then be used in the bread making process, is taken according to the present process to a divider 3 where it is cut into small pieces of from 4 to 8 ozs. The output of the divider then passes to station 4, or a chopper, where it is cut in its moist condition, by revolving knives to small, relatively uniform lumps or pellets of ⅛ to ½ inch diameter. It may be understood that other means for forming pellets may be utilized. For example, the sponge may be rolled into thin sheets and cut by knives into strips which are thereafter chopped into chips or pellets. It is also within the scope of the invention to extrude the dough through an orifice to form pellets. These lumps or pellets, however formed, are then blown into the drier 5 immediately after formation. The drier may be of the rotary drum type provided with a low temperature inlet 10 and a plurality of high temperature inlets 11 for hot air.

The drier may also be provided with a suitable inlet shown diagrammatically at 12 and an outlet 13. As shown in Fig. 2, an initial zone A is provided which is maintained at a temperature of from 75 to 120° F. and preferably from 100 to 120° F. The purpose of this controlled initial zone, in which the lumps or pellets are first treated for approximately five minutes, is to produce an enclosing protecting crust on each individual lump. It has been found that where an initial treating temperature in excess of 120° F. is first contacted by the sponge lumps a deadening of the sponge is produced, i. e. the yeast cells are exploded and killed. For the initial crust formation a temperature in excess of 75° F. and preferably in excess of 100° F. is used.

If the lumps or pellets are first treated at a temperature lower than 75°, no initial protecting crust is formed thereon and fermentation or working continues throughout each lump so that the yeast cells are inactivated. After the initial formation of the enclosing crust, the lumps may then be thoroughly dried, as in the remainder of the drum or zone B at temperatures ranging from 120° to 200° F.

Preferably the sponge is dried to a moisture content of from 1 to 2%, although a moisture content of up to 7% has been found to be satisfactory in some instances. It has also been found that the moisture content of the lumps may be carried down far below 1% without harm to the sponge. The pellets as shown, form a bed M which is agitated by the drum rotation or by any suitable means and gradually work their way to the outlet 13.

The dry sponge-like pellets may then be ground as in a hammer mill indicated at 6, to a flour, and thereafter bagged as at 7, for shipment and use. The final dry product will keep indefinitely and when reconstituted, as by the addition of water, has been found to exhibit all the characteristics of fresh sponge. It may be added to additional flour and yeast together with leavening and other constituents to form a bread dough as desired. It has also been found to form a desirable additive in cake mixes and especially desirable in doughnut mixes where it produces a superior dough for doughnuts.

Doughnut mixes including 5 to 15%, based on the weight of the dry ingredients, of the sponge of the present invention have been found to be especially light and palatable while still retaining the desirable flavor of the "cake" type doughnut. Further the addition of the bread sponge of the present invention makes it possible to fry doughnuts on both sides simultaneously without producing a heavy, soggy doughnut having an undesirable fat penetration.

The following specific examples serve to illustrate but are not intended to limit the present invention.

EXAMPLE I

Dehydrated sponge

A mixture was made of 100 lbs. of flour, 48 lbs. of water, 2½ lbs. of yeast and ¼ lb. of a suitable yeast food. The various ingredients were thoroughly commingled in a conventional dough mixer at 72° F. Thereafter the dough product was moved to a proofing room where it was kept at 85° F., for approximately five hours. At this time the temperature of the dough rose approximately 6°, or to 78° F. Thereafter, the sponge thus produced was divided in a conventional divider into 4 to 8 oz. lumps and carried therefrom by a conveyor into a chopper or grinder, provided with rotary knives and a coarse screen. These plastic mass lumps were then comminuted by the knives and passed through the screen as relatively smaller pieces or pellets having an average size of between ⅛ and ½ inch. The output from this chopper was then quickly blown into the receiving end zone of a rotary drum drier having a treating temperature of approximately 100° F. for the formation of the desired protecting crust thereon after which these encrusted particles are dried at increasing temperatures toward the outlet end of approximately 180° F. The rotary drum drier was operated on a slight inclination so that the particles or pellets, being carried and cascaded by the drum are gradually gravitated to the outlet end. The average pellet, therefore, was first treated for approximately five minutes at a temperature of between 100° and 120° F., and was then dried at gradually increasing temperatures up to 180° for approximately an additional hour. Upon exit from the drier, the pellets contained about 1% of moisture and were in a generally thoroughly dried and friable condition. The pellets were then fed into a hammer mill and ground to a flour for packaging.

EXAMPLE II

Bread dough with sponge flour 325 lbs. of dried sponge flour of Example I was mixed with 400 lbs. of water, 175 lbs. of white wheat flour, 35 lbs. of sugar, 15 lbs. of milk, i. e., dry milk solids, 15 lbs. of fat, 10 lbs. of yeast, and 10 lbs. of salt. The whole was thoroughly mixed and then set in a trough for 35 minutes before scaling or dividing into single loaves. It was then passed through an overhead proofer and thereafter formed into bread loaves which were filled into suitable pans. It was then allowed to stand about an hour in a proof box and baked at the usual white bread temperatures. A fine uniform white loaf was produced having superior crust and texture.

EXAMPLE III

Rye bread

A mixture was made of 1 lb. of sour dough, 2 lbs. of water, 1 oz. of yeast and 2 lbs. of rye flour. This mixture was allowed to age for four hours at 72 to 75° F. Thereafter an additional 5 lbs. of rye flour and 3 lbs. of water were added to the mixture and thoroughly mixed. The second mixture was also allowed to age for four hours. To this mixture 13 lbs. of rye flour and 7 lbs. of water were added and the whole thoroughly mixed. This final mixture was then also allowed to age for four more hours. Thereafter the rye sour thus prepared was treated as described in Example I, i. e. it was divided, chopped and then dried and ground to a flour under the conditions there described. After grinding the dried product, a suitable homogeneous dried sour sponge flour was produced. This flour may then be used as and when desired to prepare rye bread by merely adding approximately 40 lbs. of the dried rye sponge to 60 lbs. of rye flour, or part white flour where a lighter rye bread is desired and then to this mixture should be added approximately 1 lb. of yeast, 2 lbs. of salt and 35 lbs. of water. After thorough mixture the resultant dough is allowed to stand for only about 10 minutes and then baked at a high temperature to produce the desirable rye crust.

EXAMPLE IV

Submerged fried doughnuts

A suitable doughnut base material was produced by creaming 4 lbs. of sugar, 10 oz. of milk powder, 4 oz. of egg yolk, 10 oz. of shortening, 2 oz. of soda, a ¼ oz. of mace and 3 oz. of salt. Thereafter to the cream mixtures 1½ lbs. of the dehydrated sponge of Example I was added and thoroughly mixed. To this mixture was then added 11 lbs. of cake flour, 1½ lbs. of bread short patent flour and 2½ oz. of sodium phosphate. All of this material was then mixed together and 2½ lbs. of water added to each 5 lbs. of the mixture. The resultant material was formed into doughnuts of a suitable shape and fried by complete immersion in hot fat. The resultant doughnuts were much lighter than average while still retaining a desirable cake flavor. They were completely free from the heavy soggy characteristics of doughnuts prepared by complete immersion frying without the addition of the sponge mix.

It will be obvious to those skilled in the art that various changes may be made without departing from the spirit of the invention and therefore the invention is not limited to what is shown in the drawings and described in the specification but only as indicated in the appended claims.

I claim:

1. A process for the preparation of dehydrated dough sponge comprising dividing moist dough sponge into relatively uniform pellets, thereafter initially drying said pellets by subjecting the same to a heated zone having a temperature of from 75° F. to 120° F. for approximately five minutes, thereby producing a protective crust thereon and thereafter drying said pellets to a moisture content below 7% by subjecting said pellets to a heated zone having a temperature of from 120° F. to 200° F.

2. A process for the preparation of a comminuted dehydrated dough sponge comprising dividing moist dough sponge into relatively uniform pellets, initially drying said pellets by subjecting the same to a heated zone having a temperature of from 100° F. to 120° F. for approximately five minutes, thereby producing a protective crust thereon, thereafter drying said pellets to a moisture content below 7% by subjecting said pellets to a heated zone having a temperature of from 120° F. to 200° F. and thereafter grinding said pellets.

3. The product produced in accordance with the process of claim 2.

DONALD A. BATTISTE.

REFERENCES CITED

The following references are of record in the file of this patent:

UNITED STATES PATENTS

| Number | Name | Date |
| --- | --- | --- |
| 1,042,647 | Castle | Oct. 29, 1912 |
| 1,910,967 | Ruckdeschel | May 23, 1933 |
| 2,322,940 | Kirby | June 29, 1943 |
| 2,449,411 | Rappaport | Sept. 14, 1948 |
| 2,476,242 | Ginsberg | July 12, 1949 |